(12) United States Patent
Kroeger

(10) Patent No.: US 8,798,196 B2
(45) Date of Patent: Aug. 5, 2014

(54) PEAK-TO-AVERAGE POWER RATIO REDUCTION FOR HYBRID FM HD RADIO TRANSMISSION

(75) Inventor: Brian W. Kroeger, Sykesville, MD (US)

(73) Assignee: iBiquity Digital Corporation, Columbia, MD (US)

(*) Notice: Subject to any disclaimer, the term of this patent is extended or adjusted under 35 U.S.C. 154(b) by 519 days.

(21) Appl. No.: 13/012,847

(22) Filed: Jan. 25, 2011

(65) Prior Publication Data

US 2012/0189070 A1 Jul. 26, 2012

(51) Int. Cl.
*H04K 1/02* (2006.01)
(52) U.S. Cl.
USPC .......................................................... 375/297
(58) Field of Classification Search
CPC ..... H04L 1/003; H04L 1/0071; H04B 1/0475
USPC ........................................ 375/295, 297, 346
See application file for complete search history.

(56) References Cited

U.S. PATENT DOCUMENTS

| | | | |
|---|---|---|---|
| 6,128,350 A | 10/2000 | Shastri et al. |
| 6,549,564 B1 | 4/2003 | Popovic |
| 6,556,557 B1 | 4/2003 | Cimini, Jr. et al. |
| 6,751,267 B1 | 6/2004 | Schill et al. |
| 7,031,251 B2 | 4/2006 | Chen et al. |
| 7,061,991 B2 | 6/2006 | Wright et al. |
| 7,319,723 B2 | 1/2008 | Jung et al. |
| 7,409,009 B2 | 8/2008 | Akhtman |
| 7,453,954 B2 | 11/2008 | Wright et al. |
| 7,542,517 B2 | 6/2009 | Kroeger |

(Continued)

FOREIGN PATENT DOCUMENTS

WO WO2009092150 A1 7/2009

OTHER PUBLICATIONS

Philipp Schmid, "Nautel HD Power Boost: How it Works", The Radio Technology Leader, Radio Magazine, Feb. 1, 2009, 12:00 p.m., http://www.printthis.clickability.com/pt/cpt?expire=&title=Nautel+HD+Power+Boost%3 . . . , 4 pages.

(Continued)

*Primary Examiner* — Daniel Washburn
*Assistant Examiner* — Fitwi Hailegiorgis
(74) *Attorney, Agent, or Firm* — Robert P. Lenart, Esq.; Pietragallo Gordon Alfano Bosick & Raspanti, LLP

(57) ABSTRACT

A method includes: (a) modulating a set of subcarriers with a set of data to produce a modulated OFDM symbol vector; (b) modulating a FM carrier signal with the set of data to produce a modulated FM symbol; (c) combining the modulated OFDM symbol and the modulated FM symbol to produce a modulated hybrid symbol; (d) limiting the magnitude of the modulated hybrid symbol to produce a first limited modulated hybrid symbol; (e) demodulating the first limited modulated hybrid symbol to recover distorted QPSK constellations; (f) constraining the distorted QPSK constellations to values greater than or equal to a minimum threshold value to produce constrained QPSK constellations; (g) demodulating the modulated hybrid symbol to produce a demodulated hybrid symbol vector; (h) subtracting the demodulated FM symbol vector from the Hybrid symbol vector to produce modified OFDM symbol vector; (i) applying a mask to inactive subcarriers in the plurality of subcarriers of the OFDM symbol vector; (j) modulating an OFDM symbol vector with OFDM modulation to produce a modified modulated OFDM symbol; (k) combining the modulated OFDM symbol and the modulated FM symbol to produce a modulated hybrid symbol; and (l) outputting the modified modulated hybrid symbol.

19 Claims, 6 Drawing Sheets

(56) References Cited

U.S. PATENT DOCUMENTS

| | | |
|---|---|---|
| 7,583,583 B2 | 9/2009 | Guo et al. |
| 7,610,028 B2 | 10/2009 | Cimini, Jr. et al. |
| 7,639,747 B2 | 12/2009 | Moffatt et al. |
| 7,792,200 B2 | 9/2010 | Molander |
| 7,822,136 B2 | 10/2010 | Moffatt et al. |
| 2002/0168016 A1 | 11/2002 | Wang et al. |
| 2005/0169411 A1 | 8/2005 | Kroeger |
| 2010/0272221 A1 | 10/2010 | Walker et al. |

OTHER PUBLICATIONS

Brian Scott Krongold and Douglas L. Jones, "PAR Reduction in OFDM via Active Constellation Extension", IEEE Transactions on Broadcasting, Sep. 2003, pp. 258-268, vol. 49, No. 3.

PEAK-TO-AVERAGE POWER RATIO REDUCTION FOR HYBRID FM HD RADIO TRANSMISSION

FIELD OF THE INVENTION

This invention relates to signal processing for radio frequency signals, and more particularly to signal processing for reducing the peak to average power ratio (PAR) in orthogonal frequency division modulated (OFDM) radio frequency signals.

BACKGROUND OF THE INVENTION

HD Radio™ digital broadcasting is a medium for providing digital-quality audio, superior to existing analog broadcasting formats. Both AM and FM HD Radio signals can be transmitted in a hybrid format where the digitally modulated signal coexists with the currently broadcast analog AM or FM signal, or in an all-digital format without an analog signal. In-band-on-channel (IBOC) HD Radio systems require no new spectral allocations because each HD Radio signal is simultaneously transmitted within the same spectral mask of an existing AM or FM channel allocation. IBOC HD Radio broadcasting promotes economy of spectrum while enabling broadcasters to supply digital quality audio to their present base of listeners. An HD Radio digital broadcasting system is described in U.S. Pat. No. 6,549,544, which is hereby incorporated by reference.

An FM HD Radio broadcasting system uses a set of orthogonal frequency division multiplexed (OFDM) subcarriers to transmit a digital signal. OFDM modulation is a well-known technique that modulates a vector of information symbols in parallel over multiple subcarriers modulated at different equally spaced frequencies, which are orthogonal to each other. This ensures that different subcarriers do not interfere with each other under normal channel conditions. OFDM modulation has proven to be an effective means for transmission over channels that experience various types of multipath and linear distortion.

A well-known drawback of OFDM is its relatively high PAR. For a large number of subcarriers, each complex dimension (in-phase and quadrature) of the OFDM signal approaches a Gaussian distribution. This results in a signal magnitude (square root of power) Probability Density Function (PDF) that approaches a Rayleigh distribution. Although the Rayleigh distribution has theoretically infinite peaks, the OFDM peak is limited by the number of parallel subcarriers (e.g., 100, or 20 dB), or more practically the typical peak can be limited to about 12 dB since there is little distortion in clipping the improbable tails (e.g., above 12 dB PAR) of the Rayleigh PDF. High Power Amplifier (HPA) power efficiency is affected since a large power backoff is required in operation to minimize peak distortion. This peak distortion not only distorts (i.e., adds noise to) the subcarrier modulation, but unwanted out-of-band emission occurs due to intermodulation distortion. This leakage, being highest immediately outside the intended spectral occupancy, can be particularly difficult to suppress with filters after the HPA output.

Several different types of PAR reduction techniques have been proposed. One type of peak-to-average power ratio reduction technique is described in U.S. Pat. No. 7,542,517, issued Jun. 2, 2009, and titled "Peak-To-Average Power Reduction For FM OFDM Transmission", which is hereby incorporated by reference.

SUMMARY OF THE INVENTION

In a first aspect, the invention provides a method comprising: (a) modulating a set of subcarriers with a set of data to produce a modulated OFDM symbol vector; (b) modulating a FM carrier signal with the set of data to produce a modulated FM symbol; (c) combining the modulated OFDM symbol and the modulated FM symbol to produce a modulated hybrid symbol; (d) limiting the magnitude of the modulated hybrid symbol to produce a first limited modulated hybrid symbol; (e) demodulating the first limited modulated hybrid symbol to recover distorted QPSK constellations; (f) constraining the distorted QPSK constellations to values greater than or equal to a minimum threshold value to produce constrained QPSK constellations; (g) demodulating the modulated hybrid symbol to produce a demodulated hybrid symbol vector; (h) subtracting the demodulated FM symbol vector from the Hybrid symbol vector to produce modified OFDM symbol vector; (i) applying a mask to inactive subcarriers in the plurality of subcarriers of the OFDM symbol vector; (j) modulating an OFDM symbol vector with OFDM modulation to produce a modified modulated OFDM symbol; (k) combining the modulated OFDM symbol and the modulated FM symbol to produce a modulated hybrid symbol; and (l) outputting the modified modulated hybrid symbol.

In another aspect, the invention provides a transmitter for reducing peak-to-average power ratio in an OFDM signal. The transmitter includes a modulator for modulating a set of subcarriers with a set of data symbol vectors to produce a first modulated signal; processing circuitry for combining the modulated OFDM symbol and the modulated FM symbol to produce a modulated hybrid symbol, limiting the magnitude of the modulated hybrid symbol to produce a first limited modulated hybrid symbol, demodulating the first limited modulated hybrid symbol to recover distorted QPSK constellations, constraining the distorted QPSK constellations to values greater than or equal to a minimum threshold value to produce constrained QPSK constellations, demodulating the modulated hybrid symbol to produce a demodulated hybrid symbol vector, subtracting the demodulated FM symbol vector from the hybrid symbol vector to produce an OFDM symbol vector, applying a mask to inactive subcarriers in the OFDM symbol vector, modulating the OFDM symbol vector to produce a modulated OFDM symbol, combining the modified modulated OFDM symbol vector with the modulated FM symbol to produce a modified modulated hybrid symbol, and outputting the modified modulated hybrid symbol; and an amplifier for amplifying the modified modulated hybrid symbol.

DETAILED DESCRIPTION OF THE INVENTION

In one aspect, the invention relates to a signal processing method directed toward reducing the peak to average power ratio (PAR) in OFDM-modulated radio frequency signals. This method offers improved performance for reducing the PAR while controlling undesirable out-of-band emissions. It can also include equalization within the PAR reduction algorithm to compensate for the effects of linear filter-like distortion caused by a high power amplifier (HPA) output network, as well as partial compensation for nonlinear signal compression and amplitude modulation/phase modulation (AM/PM) conversion below the peaks of the PAR-reduced signal. This method can provide an effective scheme for reducing the PAR of electronic signals using OFDM, such as FM HD Radio systems.

Figure 1:
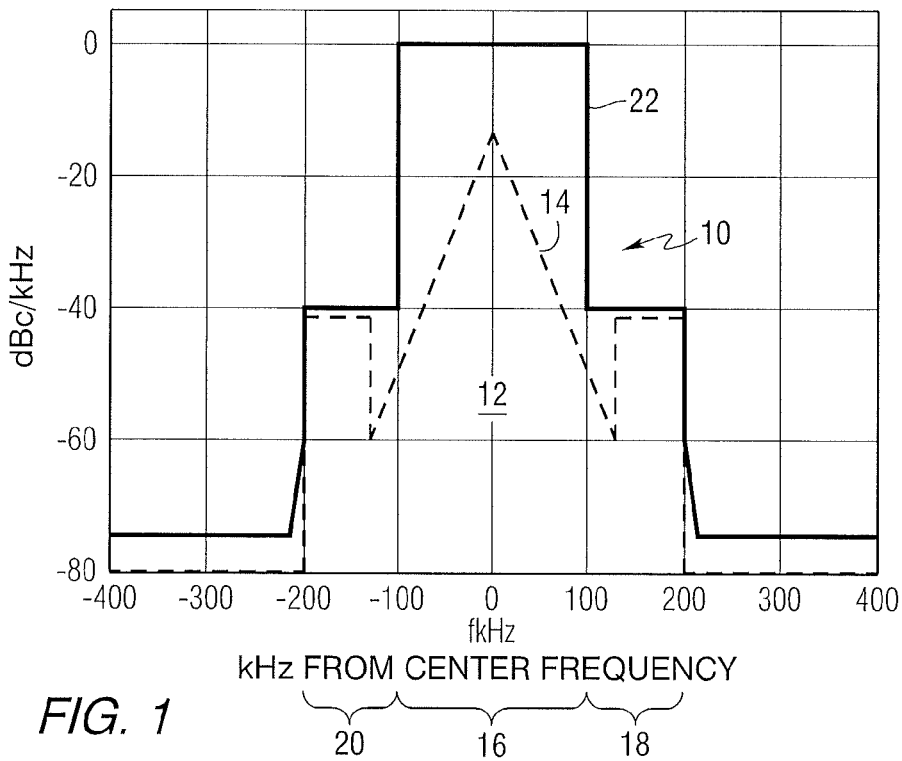
FIG. 1 is a schematic representation of an HD Radio FM Hybrid mode ideal signal and spectral mask.

FIG. 1 is a schematic representation of the frequency allocations and relative power spectral density of the signal components for a hybrid FM IBOC HD Radio signal 10. The hybrid format includes the conventional FM stereo analog signal 12 having a power spectral density represented by the triangular shape 14 positioned in a central frequency band 16 portion of the channel. The Power Spectral Density (PSD) of a typical analog FM broadcast signal is roughly triangular with a slope of about −0.35 dB/kHz from the center frequency. A plurality of digitally modulated evenly spaced subcarriers are positioned on either side of the analog FM signal, in an upper sideband 18 and a lower sideband 20, and are transmitted concurrently with the analog FM signal. All of the carriers are transmitted at a power level that falls within the United States Federal Communications Commission (FCC) channel mask 22. The vertical axis in FIG. 1 shows the peak power spectral density as opposed to a more conventional average power spectral density characterization.

In an FM Hybrid HD Radio modulation format, the digital signal is transmitted on the OFDM subcarriers located on either side of the analog spectrum. A group of evenly spaced orthogonal frequency division multiplexed (OFDM) subcarriers are placed on each side of the host analog FM signal occupying the spectrum from about 129 kHz through about 199 kHz away from the host FM center frequency as illustrated by the upper sideband and the lower sideband in FIG. 1. In this hybrid system example, the total digital signal power in the OFDM modulated subcarriers in each sideband is set to about −23 dBc (relative to its host analog FM power). However, recent FCC rule modifications allow the power of each sideband to be between −23 dBc and −13 dBc. The power on each sideband can be adjusted independently to accommodate interference conditions for the station's coverage area. One particular Hybrid mode signal includes 191 subcarriers above and 191 subcarriers below the host FM spectrum in frequency. Each subcarrier is QPSK modulated at a symbol rate of 344.53125 Hz. The in-phase and quadrature phase pulse shapes are root raised cosine tapered (excess time=7/128) at the edges to suppress the spectral sidelobes. This pulse shape results in an orthogonal subcarrier frequency spacing of 363.3728 Hz.

Figure 2:
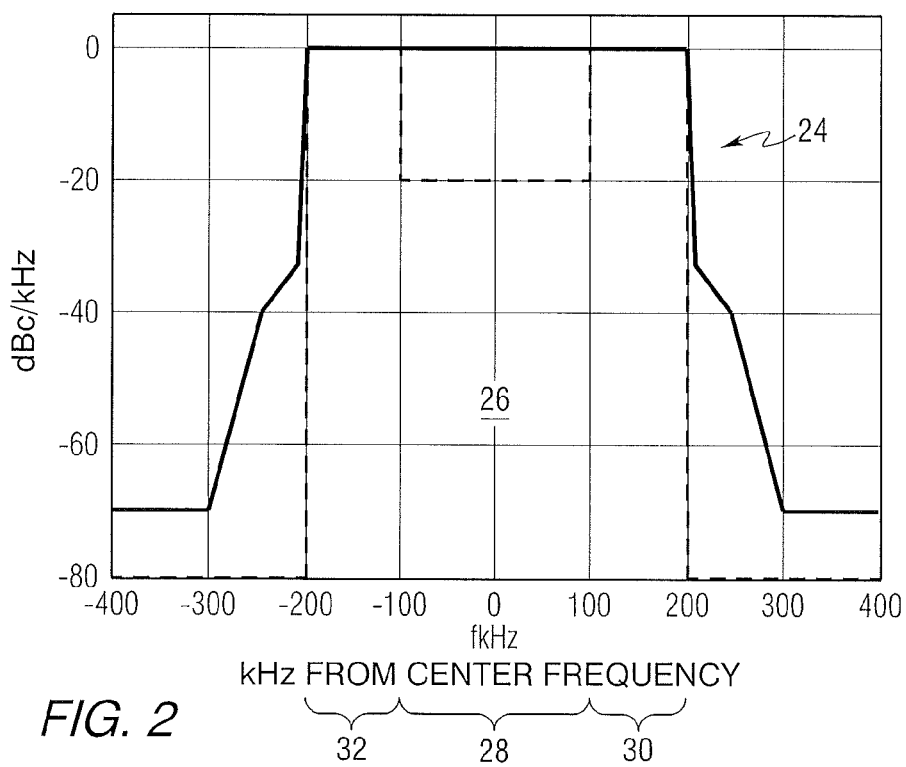
FIG. 2 is a schematic representation of an HD Radio FM All-Digital mode ideal signal and spectral mask.

The digitally modulated portion of the hybrid signal is a subset of an all-digital signal that will be transmitted in the all-digital FM HD Radio format. The spectral placement and relative signal power density levels of the OFDM digital subcarriers in an all-digital FM HD Radio format, illustrated by item number 24, is shown in FIG. 2. The analog FM signal of FIG. 1 has been replaced by additional groups of OFDM subcarriers, referred to as the extended all-digital signal 26, located in the central frequency band 28. Once again, evenly spaced OFDM subcarriers are positioned in an upper sideband 30 and a lower sideband 32. The sidebands of the all-digital format of FIG. 2 are wider than the sidebands of FIG. 1. In addition, the power spectral density level of the all-digital outer signal sidebands is set about 10 dB higher than that allowed in the hybrid IBOC sidebands. This provides the all-digital signal with a significant performance advantage. Furthermore, the power spectral density of the secondary all-digital signal in the middle of the spectrum is about 15 dB below that of the hybrid sidebands. This minimizes any interference problems to adjacent hybrid or all-digital signals while providing additional capacity for other digital services.

The all digital mode of FIG. 2 is a logical extension of the hybrid mode where the analog signal, which previously occupied the central ±100 kHz region, is replaced with low level digital subcarriers. Located on either side of the low-level carriers are two digital sidebands that differ from the hybrid mode by increasing the bandwidth to about 100 kHz and increasing the power by about 10 dB. An all digital system includes 267 carriers in each sideband and 559 carriers in the center. Each digital subcarrier is QPSK modulated. The in-phase and quadrature phase pulse shapes are root raised cosine tapered (excess time=7/128) at the edges to suppress the spectral sidelobes. This pulse shape results in orthogonal subcarrier frequency spacing of 363.3728 Hz. The power spectral density plots for the transmitted signal should be well within the all-digital FM IBOC mask.

Figure 3:
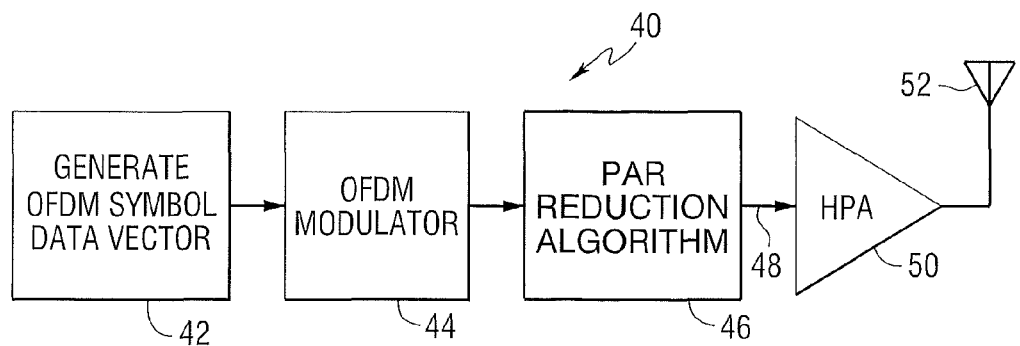
FIG. 3 is a simplified functional block diagram of a transmitter system including a PAR reduction algorithm.

FIG. 3 is a simplified functional block diagram of a transmitter system including a PAR reduction algorithm inserted between the OFDM modulator and the HPA. The transmitter 40 includes a symbol generator 42 that produces OFDM symbol data vectors consisting of a group of Quadrature Phase Shift Keying (QPSK) data symbols containing the information to be transmitted on each of the active subcarriers. These symbols are passed to a modulator 44 wherein each OFDM symbol data vector is modulated to produce the digital time-domain signal samples (normalized). This modulation includes passing the data symbols through an Inverse Fast Fourier Transform (IFFT) to realize the OFDM modulation. A cyclic prefix, along with a root raised cosine window, is applied to the modulated signal (excess time=7/128). The combination of the IFFT and the windowing operation is referred to henceforth as the OFDM modulator. The modulated output of OFDM modulator is passed as an input to the PAR reduction algorithm 46. The output 48 of this block is amplified by the high power amplifier 50 and forms the signal to be transmitted with a reduced PAR at antenna 52.

Figure 4:
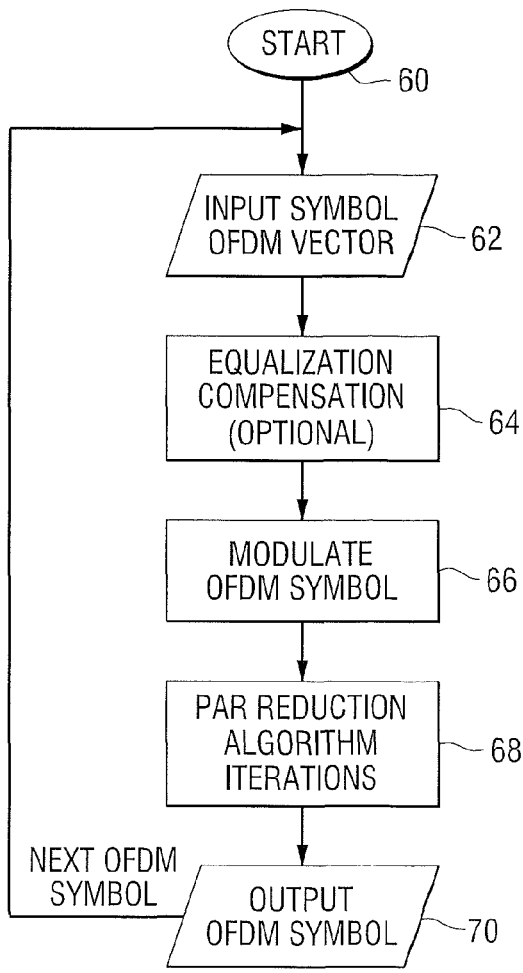
FIG. 4 is a top-level flowchart of a PAR reduction algorithm.

A top-level flowchart of major PAR reduction algorithm steps is presented in FIG. 4. This flowchart starts at block 60 and shows the operations of inputting an OFDM symbol vector, through outputting modulated and PAR-reduced time domain signal samples for each OFDM symbol. The Input OFDM Symbol Vector block 62 shows that the input is a data vector comprising the bit pairs for each active QPSK subcarrier for the OFDM symbol. This can be viewed as the frequency-domain representation for each FFT bin (subcarrier) prior to OFDM modulation, where the FFT converts a complex time-domain signal block into complex frequency component bins uniformly spaced over the sample-rate bandwidth. Each active bin is represented by a complex binary number for QPSK modulation on that bin (subcarrier). Active bins with intentionally-reduced signal levels can be scaled to other binary sets of levels. Inactive bins are initially set to zero.

The Equalization Compensation block 64 shows an optional equalization compensation step. When linear distortion (filtering) is a significant factor at the transmitter's output network (HPA output), then equalization compensation can be used to precorrect the input to the HPA. The equalization compensation uses a vector (the same size as the input vector) containing the reciprocal of the complex output gain (linear distortion) for each subcarrier. The complex gain associated with each bin is a complex number which, in effect, multiplies (distorts) the original complex frequency sample (bin). Each of the elements of the input vector is multiplied by each of the corresponding element of the equalization vector to yield an equalized input symbol data vector.

A linear equalizer could be placed before the HPA to compensate for these effects. However, in a transmission system using the PAR reduction algorithm, this compensation would result in peak regrowth of the signal. This peak regrowth occurs because the phases and amplitudes of the signal have been slightly modified in the PAR algorithm to, in effect, cancel at the peaks. The equalization applied outside the PAR algorithm would change the phase and amplitude relationships where the peaks would not cancel in the same way. Placing this equalization prior to the previously-described PAR algorithm is also ineffective since the PAR algorithm will undo the equalization. However, a modification to the PAR algorithm to include equalization can be effective and is described next.

The equalization compensation uses a vector (same size as OFDM symbol input vector) containing the reciprocal of the complex output gain (linear distortion) values for each subcarrier (active or inactive). Each of the elements of the input vector is multiplied by each of the corresponding elements of the equalization vector to yield an equalized input OFDM symbol data vector. Both modulation and demodulation are used in the PAR reduction process of block 68 of FIG. 3, which is further described in FIG. 5. The OFDM modulation and demodulation steps in the above algorithm remain unchanged, although the resulting OFDM symbol time domain samples are somewhat different due to the equalization. The equalization within the PAR reduction algorithm is either removed or restored at several steps in the algorithm such that the QPSK constraints imposed on the OFDM symbol vectors do not undo the equalization. Examples of the Equalization Compensation and removal algorithms are:

EQUALIZATION COMPENSATION:

OFDM_symbol_vector = input next OFDM symbol vector (e.g., 2048 complex elements)

$$\text{EQ\_OFDM\_symbol\_vector} = \begin{bmatrix} EQ_0 & & & & 0 \\ & EQ_1 & & & \\ & & \bullet & & \\ & & & \bullet & \\ 0 & & & & EQ_{2047} \end{bmatrix} \cdot \text{OFDM\_symbol\_vector}$$

REMOVE EQUALIZATION COMPENSATION:

EQ_OFDM_symbol_vector = input next OFDM symbol vector (e.g., 2048 complex elements)

$$\text{OFDM\_symbol\_vector} = \begin{bmatrix} 1/EQ_0 & & & & 0 \\ & 1/EQ_1 & & & \\ & & \bullet & & \\ & & & \bullet & \\ 0 & & & & 1/EQ_{2047} \end{bmatrix} \cdot \text{EQ\_OFDM\_symbol\_vector}$$

The Modulate OFDM Symbol block 66 shows that the input symbol data vector is converted into a time domain signal for each OFDM symbol. This transformation is performed via an Inverse Complex Fast Fourier Transform (IFFT), and then a cyclic prefix with a predetermined guard time is appended to the end of the output vector prior to tapering the ends of the symbol with a root-Nyquist pulse shape. This guard time, cyclic prefix extension, and windowing are used to improve the signal's performance in the presence of multipath interference, as well as to suppress the frequency sidelobes of the subcarriers resulting in reduced out-of-band emissions.

The PAR reduction algorithm iterations block 68 represents the algorithms used in reducing the PAR of the modulated OFDM symbol. The Output OFDM Symbol block 70 outputs the time domain samples of the PAR-reduced OFDM signal. Then the process continues for subsequent OFDM symbols.

Figure 5:
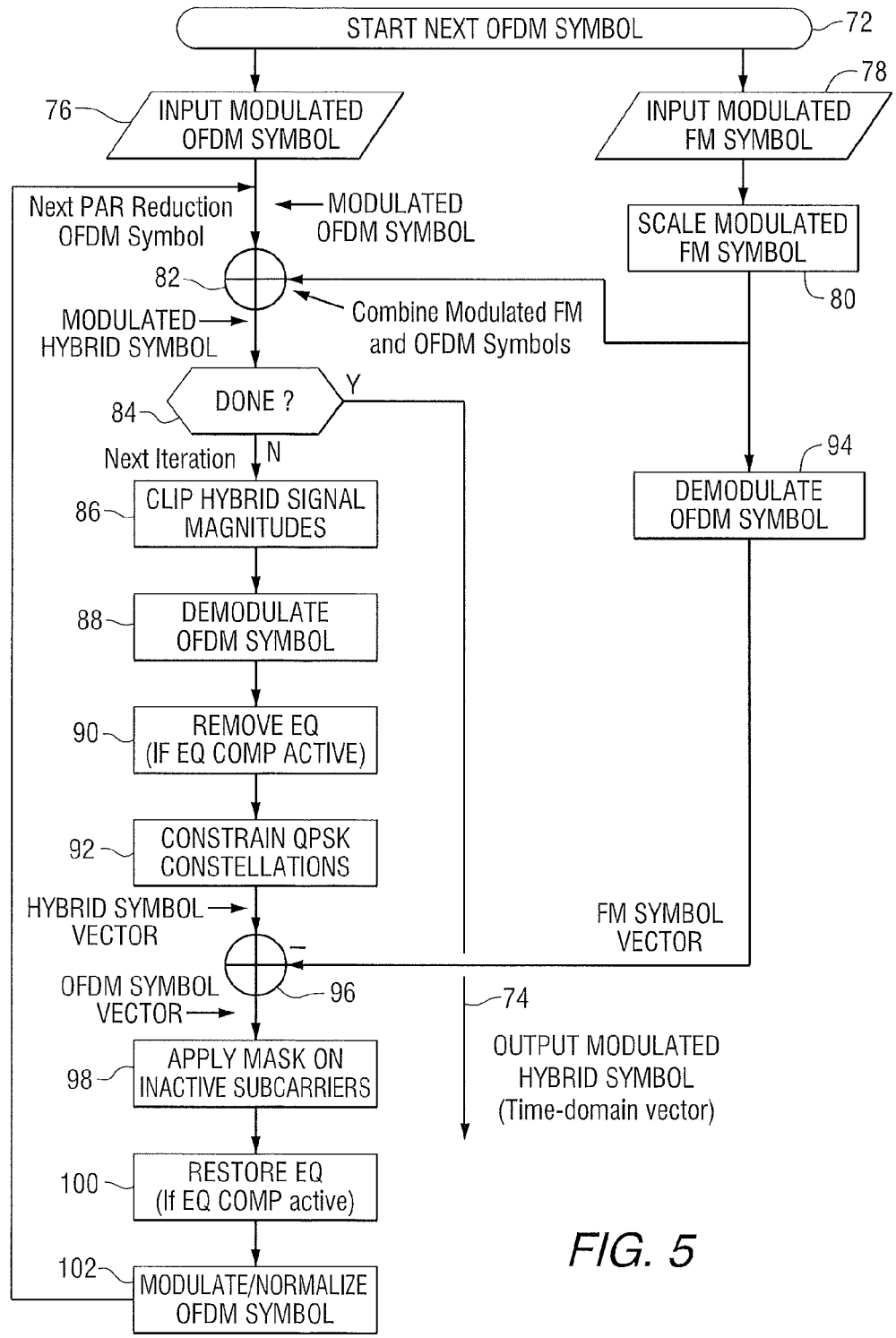
FIG. 5 is a flowchart of a PAR reduction algorithm iterations block.

The PAR reduction algorithm iterations block 68 represents the algorithm used in reducing the PAR of the modulated OFDM symbol. The details of these algorithms are illustrated in the flowchart of FIG. 5. The input to this flowchart is a sequence of modulated OFDM symbols, while the output is the PAR-reduced version of these symbols. This iterative algorithm reduces the PAR of the symbol while constraining the frequency domain (symbol vector) distortion and out-of-band emissions to acceptable levels. After some iterations, the algorithm converges to an acceptable compromise PAR while constraining the distortion to acceptable levels.

In the process illustrated in FIG. 5, there are 6 types of symbol vectors in total. There are both frequency domain and time domain symbol vectors for each OFDM symbol, FM symbol, and Hybrid symbol (i.e., combined OFDM and FM). So here is a suggestion to (re)name these as follows. In the following description the word "Vector" is used to imply the frequency domain, and the words "Modulated Symbol" are used for the time domain.

In particular, the frequency and time domain symbol quantities are: OFDM Symbol Vector (frequency domain); Modulated OFDM Symbol (time domain); FM Symbol Vector (frequency domain); Modulated FM Symbol (time domain); Hybrid Symbol Vector (frequency domain); and Modulated Hybrid Symbol (time domain).

In one aspect, the invention provides a method and apparatus that employs a hybrid PAR reduction algorithm to accommodate the analog FM signal in a hybrid IBOC radio system. The flowchart of FIG. 5 starts at block 72 with a hybrid IBOC signal including a plurality of symbols. Notice that two paths are started here, one path for the modulated OFDM symbol time-domain samples, and the other path for the corresponding modulated FM symbol samples. These symbols normally consist of 2160 complex time-domain samples each. This algorithm processes one symbol period at a time. The next symbol requires another execution of this algorithm, and so on.

The next Modulated OFDM Symbol is both the input and output of block 76. It simply shows that the algorithm is processing the next Modulated OFDM Symbol. If the Modulated OFDM Symbol is not directly available in the time domain, then the Modulated OFDM Symbol can be derived from the frequency-domain OFDM Symbol Vector (see block 62 of FIG. 4) via IFFT with OFDM Modulation, as was previously described. The OFDM Symbol Vector can be viewed as the frequency-domain representation for each FFT bin (subcarrier) prior to OFDM modulation, comprised of QPSK In-phase and Quadrature values for the active subcarriers, as well as some "noise" values in the inactive subcarriers.

The next Modulated FM Symbol of block 78 is a vector of FM analog time-domain signal samples, corresponding in time to the Modulated OFDM Symbol samples. The Modulated FM Symbol of block 78 is scaled in amplitude in block 80 to provide the proper ratio of analog and digital signals. Block 94 demodulates the Modulated FM Symbol using the same demodulation as is applied to the OFDM symbols. The demodulation output is the frequency-domain FM Symbol Vector. This is done to enable later frequency-domain subtraction of the FM Symbol Vector from the processed Hybrid Symbol Vector.

The Modulated OFDM Symbol and Modulated FM Symbol are combined in block 82 to form the Modulated Hybrid Symbol.

Block 84 determines if the last iteration of the PAR Reduction algorithm is done, and either continues another iteration, or outputs the Modulated Hybrid Symbol. The "DONE" condition can be determined simply by counting a fixed number of iterations, although it is possible to use some other metric such as the actual PAR for this iteration. Most of the possible PAR reduction is accomplished within 8 iterations.

The modulated FM symbol vector is scaled as shown in block 80 and combined with the modulated OFDM symbol vector in summation point 82. The algorithm processes samples of the FM analog signal that span each digital symbol. In one example, these are both vectors of 2160 complex sample per symbol at a sample rate of 744,187.5 Hz. For the purposes of this description, the symbols that are output from summation point 82 are referred to as modulated hybrid symbols.

A test is performed in block 84 to determine if the PAR reduction algorithm is done. If so, the modulated hybrid symbol is output on line 74. If not, an iteration of the algorithm is performed.

The modulated hybrid symbol magnitudes are clipped as shown in block 86. The Clip Signal Magnitudes block 86 represents a function that clips (limits) the magnitude of the complex time domain OFDM symbol samples (of the modulated hybrid symbol) to a predetermined value. The phase of each sample is preserved. The peak-to-average power ratio reduction is accomplished through iterative peak clipping and other signal processing to repair the distortion effects and unwanted spectral emissions. The iterative repair process partially restores the peak, but the peak gradually diminishes with each iteration. The "optimum" clip level for an all-digital IBOC signal had been empirically established at 1.5 times (or 3.52 dB) the average envelope level voltage. This "optimum" level offers the best peak reduction over a span of iterations while the undesirable byproducts being repaired at each iteration meet the signal integrity and out-of-band emission requirements.

For convenience, the nominal RMS value of the input complex OFDM time domain signal samples is scaled to one. The samples with magnitudes below 1.5 are unaffected; however, samples above 1.5 magnitude are set to 1.5 while preserving the phase of the input sample. Detecting samples above the clip level can be performed using the magnitude squared samples to minimize computations of the square root.

The following algorithm can be used as an example:

| | |
|---|---|
| $s_n = \text{Re}\{s_n\} + j \cdot \text{Im}\{s_n\};$ | input next complex signal sample |
| $\text{magsq}_n = \text{Re}\{s_n\}^2 + \text{Im}\{s_n\}^2;$ | compute magnitude squared |
| if $(\text{magsq}_n > 2.25)$ then let $s_n = 1.5 \cdot \dfrac{s_n}{\sqrt{\text{magsq}_n}};$ | clip if mag > 1.5 (equiv.) | where $s_n$ is the complex MODULATED HYBRID SYMBOL to be clipped, and $\text{magsq}_n$ is its magnitude squared. The last step of the algorithm replaces $s_n$ with a magnitude-clipped version of $s_n$ having the same phase.

Figure 6:
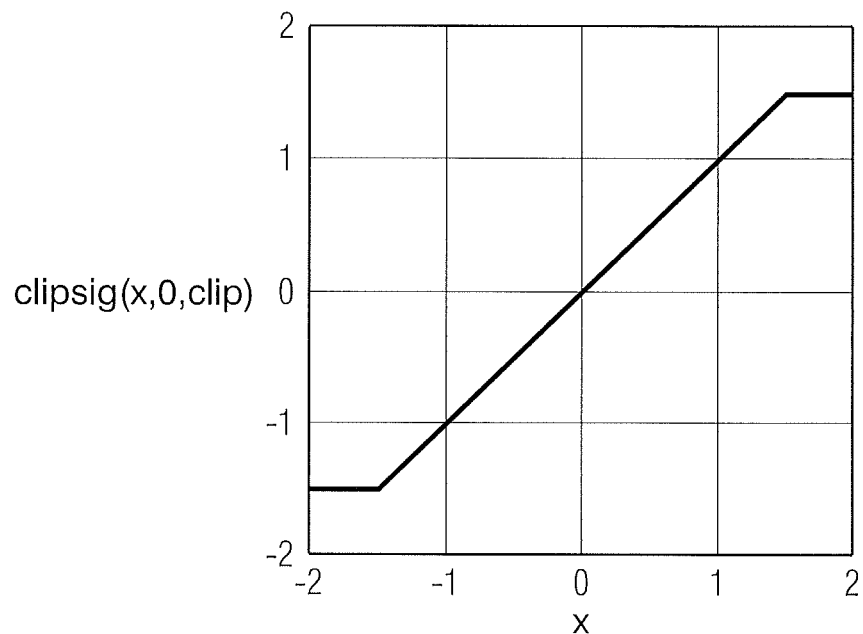
FIG. 6 is a graph showing magnitude clipping nonlinearity function.

Although both soft and hard limiting functions can be used for clipping, the hard limiting function illustrated in the plot of FIG. 6 has shown to be simple and effective for this example. If the final PAR-reduced time-domain signal applied to the HPA is still expected to experience some compression at these reduced peaks, then a soft clipping or compression modeling the HPA should be included in this clipping process. By inclusion of this additional HPA compression, the PAR iterations will reduce the effects of this distortion.

The clip level for a hybrid signal depends upon the relative levels of the digital and analog components. Since the analog FM signal has a PAR of 1 (or 0 dB), the clip level of an analog-only signal would be one; thus, it would not need clipping. The clip level for a hybrid signal depends upon the relative levels of the digital and analog components. It is desirable to set this clip level based on an arbitrary analog-to-digital ratio.

The algorithm normalizes the digital portion of the signal to unity power (voltage squared), then adds the FM analog signal at the desired relative level. The analog signal is assumed to be a baseband complex exponential with unity power (magnitude=1), which is scaled by variable scalefm to achieve the desired analog-to-digital ratio. Intuitively, an expression to set the clip level should asymptotically approach 1.5 as the analog signal becomes very small compared to the digital component. Similarly, the clip level should asymptotically approach scalefm as the digital signal becomes very small compared to the analog.

$$\lim_{scalefm \to 0} clip = 1.5; \text{ and } \lim_{scalefm \to \infty} clip = scalefm$$

The simplest expression meeting the criteria would be clip=1.5+scalefm

However, this expression does not provide the best clip level with intermediate scalefm values, and there is particular interest in the FCC-approved range of scalefm between 10 and 20 dB.

$3.16 \leq scalefm \leq 10$

An expression for clip that has been empirically determined to meet the "optimization" criteria is clip=$\sqrt{(1.5)^2 + scalefm^2 + 1.25 \cdot scalefm}$ A negative clip threshold is also established. Some Hybrid signal HPAs have difficulty accommodating signals when the signal envelope approaches zero, or becomes small (negative dB). For this reason, a negative (dB) clipping level is also established. The negative clip limits the magnitude of $s_n$ (negative in dB) below the RMS signal value. This level is dependent upon the actual HPA, and is not always needed. However, it was found that a negative clip level of −3 dB (or 0.707 magnitude) can be accommodated by the PAR Reduction algorithm without significant compromise on other performance parameters. So it may be prudent to set a default negative magnitude clip level of −3 dB (or 0.707 magnitude), which can be adjusted for any particular HPA requirement.

Next the OFDM symbol is demodulated as shown in block 88. The demodulation process in this block is the reverse of the modulate OFDM symbol process described previously. The demodulation steps include weighting and folding of the ends (cyclic prefix) of the symbol time, then computing an FFT to yield a somewhat distorted version of the input symbol data vector.

If the optional frequency-domain equalization compensation was performed in a previous step, then this equalization must be temporarily removed for some of the next steps of the algorithm in this iteration.

The Remove Eq. (if Eq. Comp. active) block 90 shows that if the optional frequency-domain equalization compensation was performed, then this equalization must be temporarily removed for some of the next steps of the algorithm in this iteration. The vector used to remove the equalization is similar to the original equalization vector, but all the elements are reciprocals of the original equalization vector.

The constrain QPSK constellations block 92 removes the significant distortion introduced by the previous signal clipping process. The intermodulation distortion caused by clipping introduces noise (distortion) into all the frequency bins of the symbol vector. This function constrains the distortion components to acceptable levels. This distortion cannot be entirely eliminated since this would have the undesirable effect of restoring the peaks back into the time domain signal. Instead the distortion is modified in such a way as to minimize the degradation in QPSK demodulation performance, and suppress out-of-band emissions to an acceptable level based upon a predefined out-of-band emissions mask vector. This process results in partial peak regrowth of the time domain signal. Multiple iterations tend toward convergence to minimize the peaks while constraining the intermodulation products to acceptable levels.

The QPSK constellations of the active subcarriers are constrained to minimize degradation in BER (Bit error rate) performance. In the absence of noise and distortion, the ideal QPSK constellation consists of complex constellation points (normalized for convenience) at (+1,+1), (+1,−1), (−1,+1) and (−1,−1) depending upon the 2 bits each symbol conveys. QPSK can also be viewed as a pair of orthogonal BPSK signals, where each of the BPSK components carries one bit. The PAR reduction algorithm, in particular the clipping, adds noise to the constellation points. A bit error occurs when the additive noise changes the polarity of one of the bits; for example, a +1.0 is corrupted to −0.1 (the noise component is −1.1 in this case). The channel adds more noise to the received signal and the BER performance is a function of the margin of the transmitted signal. In other words, if an ideal transmitted signal component +1.0 is corrupted by the PAR algorithm to output +0.5, then the system loses 6 dB of margin for that particular bit. However, other bits in the PAR reduction process can actually be enhanced since some of the distortion components will increase the +1.0 value (e.g., +1.2, or 3.5 dB improvement). Even with Forward Error Correction (FEC) improving the output BER at the receiver, the performance is degraded by the code bits that decrease the margin. Therefore, the PAR reduction algorithm constrains the loss in margin to an acceptable level relative to 1.0 (e.g., 0.85). So when the previous clipping process distorts a bit component to a value of less than a predetermined threshold (e.g., +0.85, or >−0.85 for negative polarity), then the vector is appropriately constrained to the threshold (+0.85, or −0.85 for negative polarity). The bits with a magnitude greater than 0.85 remain unchanged. This constraint has the effect of minimizing the worst case margin loss for any particular bit, while causing only modest peak signal regrowth in the time domain signal.

The appropriate value for the threshold is a compromise between loss of BER margin and peak regrowth. For example, if the threshold is set to 0.95, then the BER margin loss is even less, but the peak regrowth is greater. Successive iterations of the clipping and constraint processes continue to reduce the PAR while it meets the constellation constraints as it converges to some minimum PAR value. An example of the QPSK constraint algorithm follows:

---
CONSTRAIN QPSK CONSTELLATION:
$QPSK_n = \text{sign}(\text{Re}\{d_n\}) \cdot \max[\text{thres} \cdot |\text{Re}\{d_n\}|, \text{sign}(\text{Re}\{d_n\}) \cdot \text{Re}\{QPSK_n\}] + j \cdot \text{sign}(\text{Im}\{d_n\}) \cdot \max[\text{thres} \cdot |\text{Im}\{d_n\}|, \text{sign}(\text{Im}\{d_n\}) \cdot \text{Im}\{QPSK_n\}]$

---

In the algorithm above, $d_n$ is the appropriate complex element of the input OFDM symbol data vector where $d_n$ is the complex (possibly scaled) binary data for the corresponding QPSK symbol. The complex $QPSK_n$ value is the PAR-reduced version of that element after clipping and constraint iterations. Scaling of $d_n$ allows active subcarriers at different levels used in the all-digital option discussed later.

Figure 7:
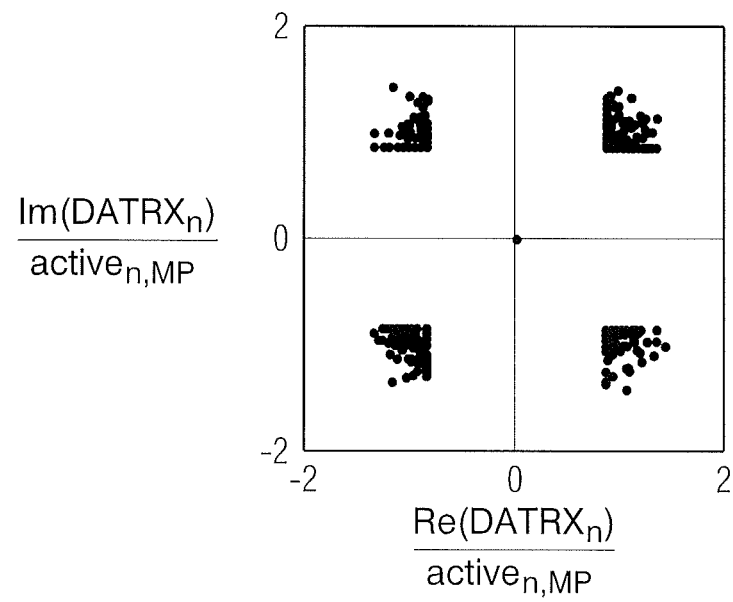
FIG. 7 is a plot showing constrained distortion in the QPSK constellations after PAR reduction algorithm.

The process of constraining the QPSK constellation points is illustrated in FIG. 7, where the threshold in this example is set to 0.85, and superimposing the points for several hundred QPSK symbols. Although some of the bits actually experience an increase in signal margin, the overall loss in BER performance is minimal.

Some systems may use reference subcarriers to aid in coherent signal tracking and to estimate channel state information (CSI) for subsequent FEC soft-decoding. It is desirable for these subcarriers to have no distortion from the PAR reduction algorithm. For these subcarriers, the constraint could be to correct these QPSK constellations to exactly the original OFDM symbol data vector values. Since the number of reference subcarriers is typically small relative to the data bearing subcarriers, the regrowth of time-domain peaks in the modulated signal is minimal.

The nonactive subcarriers are also constrained to suppress out-of-band emissions within an acceptable predetermined mask level. An out-of-band emission mask is a vector of the same size as the OFDM symbol vector, where the inactive subcarriers are associated with a maximum mask magnitude defined for each inactive subcarrier. The inactive subcarriers for each OFDM symbol vector are constrained to not exceed the mask magnitude (or magnitude squared for computational efficiency) value. Each subcarrier (FFT bin) is unaffected when its value is below the mask. When a bin exceeds the mask, the magnitude is constrained to the mask level while preserving the phase of the bin. The following algorithm achieves this mask constraint:

---
CONSTRAIN NONACTIVE SUBCARRIERS TO THE MASK:

$magsq_n = \text{Re}\{X_n\}^2 + \text{Im}\{X_n\}^2$; where $X_n$ = inactive bin value for OFDM symbol vect.

if $magsq_n > mask_n^2$, then let $X_n = X_n \cdot \dfrac{mask_n}{\sqrt{magsq_n}}$ otherwise leave $X_n$ unchanged

---

As shown in CONSTRAIN NONACTIVE SUBCARRIER TO THE MASK, algorithm, certain subcarriers are not only constrained to be under a mask, but are also allowed to have non-zero values.

The Modulated FM Symbol is demodulated as shown in block 94 and removed (i.e., subtracted) from the constrained QPSK constellation as shown in subtraction point 96. Blocks 88 and 94 show "DEMODULATE OFDM SYMBOL." Although block 94 is actually processing a MODULATED FM SYMBOL, it is demodulated as if it were an OFDM symbol so that its effects can be processed in the frequency domain on the OFDM SYMBOL VECTOR.

The addition (Block 82) of the Modulated FM Symbol to the Modulated OFDM Symbol and later subtraction (Block 96) of the FM Symbol Vector are key elements of this method. First, the addition of the Modulated FM Symbol allows the composite Modulated Hybrid Symbol to be PAR-reduced (clipped). Subsequent OFDM demodulation in Block 88 includes the interference effects of the Modulated FM Symbol; however, these interference effects are eliminated in the Constrain QPSK Constellations Block 82. Therefore, this method eliminates analog-to-digital host interference caused by the FM bandwidth extending beyond ±100 kHz. Second, the FM Symbol Vector subtraction (Block 96) allows subsequent suppression (Apply Mask on Inactive Subcarriers Block 98) of the intermodulation products due to the clipping. If the FM Symbol Vector were not removed, then it would be impractical to process the intermodulation products that lie far beneath the FM signal spectrum. Therefore, this method also reduces the digital-to-FM interference, or intermodulation distortion to the FM signal due to clipping.

Previous methods of accommodating inner subcarriers in the expanded HD Radio modes (i.e., MP2, MP3, MP4) were problematic because of this host FM analog-to-digital interference. The remedies included reducing the modulation deviation on the analog signal, or possibly increasing the inner subcarrier powers, both unattractive options. This Hybrid PAR reduction algorithm avoids the need for these undesirable remedies.

After the OFDM signal is demodulated and removed from the constrained QPSK constellation, a mask is applied to the inactive subcarriers in block 98, and equalization is restored in block 100.

The restore equalization (if equalization compensation is active) block 100 shows that if the optional frequency-domain equalization compensation was performed in a previous step, then this equalization must restored since it was removed in a prior step.

Then the OFDM symbol is modulated and normalized in block 102 and used for the next iteration of the algorithm. This block converts the input symbol data vector into a time-domain signal for each OFDM symbol.

The modulation and demodulation steps of FIG. 5 can be described in the algorithm descriptions below.

---

MODULATE OFDM SYMBOL

---

OFDM_symbol_vector = input next OFDM symbol vector (e.g., 2048 complex elements)
sig = IFFT(OFDM_symbol_vector)
sigext = sig + append cyclic extension; append 112 samples from start of sig (now length 2160)

$$sigout = \begin{bmatrix} w_0 & & & & 0 \\ & w_1 & & & \\ & & \bullet & & \\ & & & \bullet & \\ & & & & \bullet \\ 0 & & & & w_{2179} \end{bmatrix} \cdot sigext;$$

this is the time domain signal of the OFDM symbol where w is the root raised cosine window

---

DEMODULATE OFDM SYMBOL

--- sigout = input next OFDM symbol time samples (e.g., 2160 complex elements)

$$sigw = \begin{bmatrix} w_0 & & & & 0 \\ & w_1 & & & \\ & & \bullet & & \\ & & & \bullet & \\ & & & & \bullet \\ 0 & & & & w_{2179} \end{bmatrix} \cdot sigout;$$

this is the time domain signal of the OFDM symbol where w is the root raised cosine window sig = fold cyclic prefix extension from end of sig by adding these sample to start of sig (2048)
OFDM_symbol_vector = FFT(sig)

---

Block 84 provides a means for ending the iterative algorithm on the last iteration. The last iteration could be based on a predetermined number of iterations (e.g., 4) for the PAR-reduced OFDM symbol. Once the last iteration has been reached, a hybrid signal symbol vector is output on line 74. Alternatively, the last iteration could be based on a condition meeting a predetermined PAR value if that goal is reached before a maximum number of iterations. Although this may reduce the required MIPS for PAR reduction, the signal processor should be capable of executing the maximum number of iterations if the PAR goal is not met. So reducing the actual MIPS may not be a very important goal if the signal processor must handle the worst case in any event.

Figure 8:
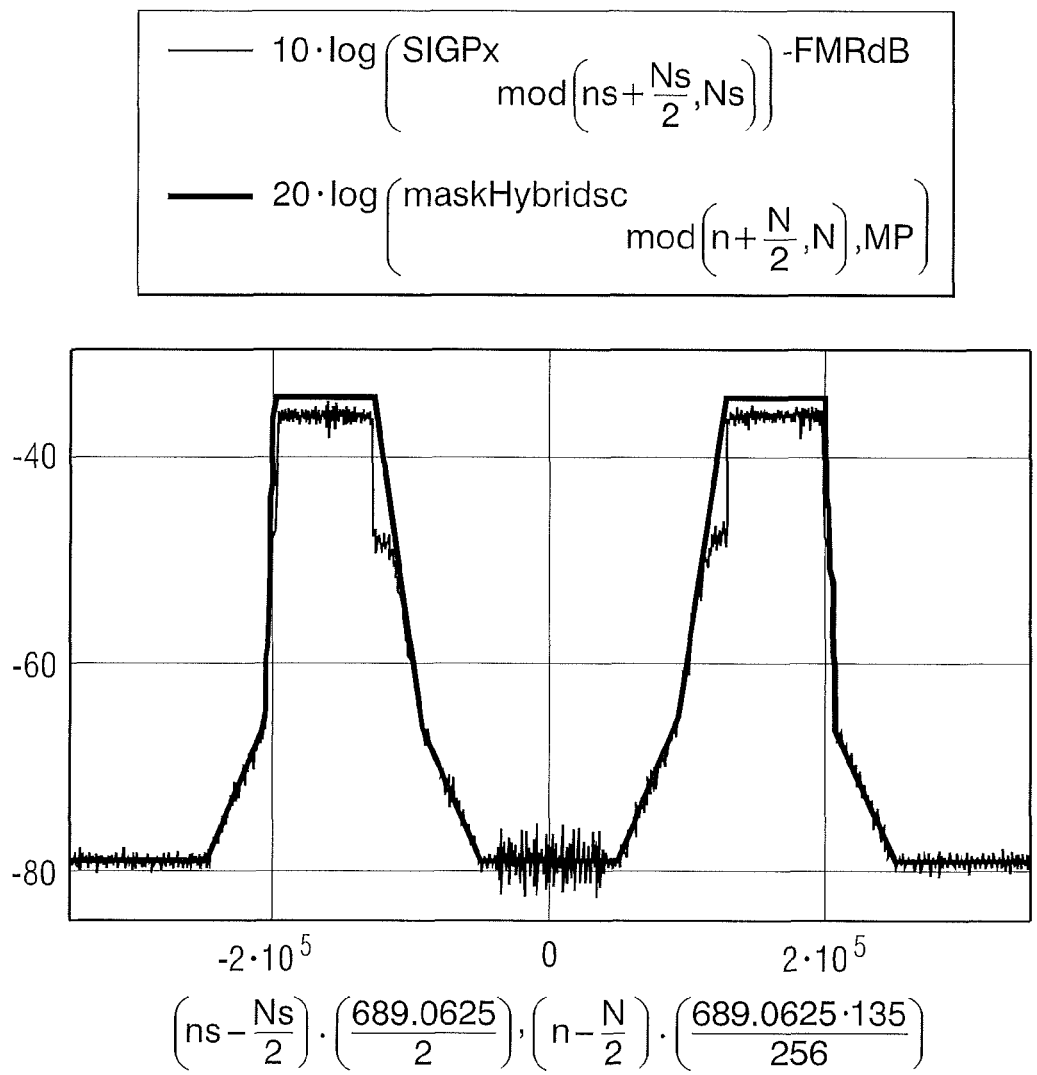
FIG. 8 is a spectral plot of the modulated signal after the PAR reduction algorithm.

A spectral plot of the modulated signal after the PAR reduction algorithm is shown in FIG. 8. This signal is for the HD Radio FM Hybrid mode MP1 utilizing active subcarriers in the frequency range of approximately 129 through 199 kHz on either side of the center FM frequency. There are 191 subcarriers on each sideband (382 total) where every nineteenth subcarrier is a reference subcarrier. The FM analog signal spectrum is omitted in this plot where only the digital portion of the signal spectrum is shown. Notice that the noise outside the active subcarriers is constrained to be under the mask.

The effect is that the algorithm will continue to reduce the peaks with each iteration in the same manner as a PAR algorithm without equalization. However, the equalization is preserved through the PAR reduction process. Simulation results confirm that the PAR reduction performance with phase equalization is statistically identical to the performance without equalization. This is to be expected since distortions and peaks are iteratively corrected and converge in the same manner. However, PAR reduction with severe amplitude equalization may be somewhat affected since this could change the effective power in the equalized output depending on the severity of subsequent filtering effects. For example, if a significant number of subcarriers are attenuated by 20 dB at the HPA output, the equalization would require proportionally more power to compensate for these subcarriers. The interaction of the intermodulation distortion over all the subcarriers of different equalized levels may have some effect on the potential PAR reduction. Furthermore, severe linear distortion can result in OFDM intercarrier interference as well as intersymbol interference which are not compensated in this algorithm. However, equalization for severely filtered HPA output signals should be used with caution.

In some applications, the desired equalization may not be a predetermined fixed vector. Filtering and antenna/HPA output network impedance matching may change due to temperature, snow and aging. A feedback signal can be used to update the characteristics of the filtering which could adaptively update the equalization vector used in the PAR reduction algorithm.

FIG. 5 shows the operations of inputting OFDM symbol data, through outputting modulated and PAR-reduced time domain signal samples for each OFDM symbol. The main modification to the algorithm of U.S. Pat. No. 7,542,517 is the addition of the analog FM analog symbol vector shown on the right-hand side of the flowchart. When used in a hybrid HD Radio system, adding in time-domain FM symbol-length vector, but subtracting frequency domain vector at every iteration removes FM-to-digital interference.

Details of one embodiment of the algorithm are illustrated by the Mathcad code example below:

| "Modulate/PAR reduce, predefined N (FFT size), active, EQ, window w"
| "DATIN is freq domain input vector for 1 OFDM symbol where QPSK bits are +−1"
| "ITER = PAR reduction iterations and limit is the QPSK constellation constraint"
| "MP is the mode determining the number of active subcarriers in active col MP"

| active ← active$^{\langle MP \rangle}$
| "Compute the sum of the energies over all subcarriers"
| Nc ← $\overrightarrow{\Sigma \text{active}^2}$
| "Scale analog relative to digital=1, using FM Ratio FMRdB"
| scalefm ← $10^{FMRdB \cdot 0.05}$
| fmsym ← fmsym·scalefm
| "Convert dBc/kHz, to noise mask levels relative to highest subcarriers (1+j):"
| maskmargindB ← 0

| mask ← maskHybridsc$^{\langle MP \rangle} \cdot [\overrightarrow{\sqrt{2 \cdot Nc} \cdot 10^{0.05 \cdot (FMRdB - maskmargindB)}}]$
| FM ← | "Demodulate analog fm symbol vector fmsym, same as OFDM"
|       | fmx ← $\overrightarrow{(w \cdot fmsym)}$
|       | for n ∈ 0 ... N − 1
|       |   $fm_n$ ← $fmx_n$ + if(n < TAPER, $fmx_{n+N}$, 0)

|       |   CFFT(fm) · $\sqrt{\dfrac{256 \, Mc}{135}}$

| "set hybrid clip level, asymotic derived"
| clip ← $\sqrt{1.5^2 + scalefm^2 + 1.25 \cdot scalfm}$
| clipneg ← scalefm·0.5
| "Apply equalization to input where EQ is a N-element vector"
| DAT ← $\overrightarrow{(DATIN \cdot EQ)}$
| "OFDM modulate to get time domain sig, then clip sig & renormalize"
| dat ← ICFFT(DAT)
| datt ← $\overrightarrow{(stack(dat, submatrix(dat, 0, TAPER-1, 0, 0)) \cdot w)}$
| "Normalize dig power=1, add fm and store input before PAR reduction"

| sigin ← $\dfrac{datt}{\sqrt{\dfrac{\overrightarrow{\Sigma(|datt|)^2}}{rows(datt)}}}$ + fmsym

| sig ← sigin
| sigmag ← $\overrightarrow{|sig|}$
| "PAR0 Peak to Average power Ratio, prior to reduction"

| $PAR_0$ ← $\dfrac{max(sigmag)^2 \cdot rows(sigmag)}{\overrightarrow{\Sigma(sigmag)^2}}$

| $PAR2_0$ ← PARfunction2(DAT, fmsym)
if ITER > 0
        | "Perform PAR reduction algorithm"
        | for iterate ∈ 1 ... ITER
        |   "clip Hybrid sig using hard value clip"
        |   for k ∈ 0 ... rows(sig) − 1

|     $sig_k$ ← $\begin{cases} \dfrac{sig_k}{sigmag_k} \cdot clip & \text{if } sigmag_k > clip \\ \dfrac{sig_k}{sigmag_k} \cdot clipneg & \text{if } sigmag_k < clipneg \\ sig_k & \text{otherwise} \end{cases}$

|   | "fold the tapered region, then demodulate OFDM symbol with CFFT"
        |   | dattrx ← $\overrightarrow{(w \cdot sig)}$
        |   | for n ∈ 0 ... N − 1
        |   |   $datrx_n$ ← $dattrx_n$ + if(n < TAPER, $dattrx_{n+N}$, 0)
        |   | "This form of the CFFT has a negative exponent and 1/N scaling."

|   |   DAT ← CFFT(datrx) · $\sqrt{\dfrac{256 \, Nc}{135}}$

|   | "remove EQ using reciprocal of EQ before constraining"

|   |   DAT ← $\dfrac{\overrightarrow{DAT}}{EQ}$

```
| |for n ∈ 0 ... N − 1
| |  if active_n
| |    |"convergence bias for secondary or lower subcarriers"
| |    |cb ← (1.125 − active_n)·0.5
| |    |DAT_n ← (1 − cb)·DAT_n + cb·DATIN_n
| |    |"constrain active subcarriers"
| |    |sgnr ← sign(Re(DATIN_n))
| |    |sgni ← sign(Im(DATIN_n))
| |    |DAT_n ← sgnr·max(limit|Re(DATIN_n)|,sgnr·Re(DAT_n)) ...
| |    |  + j·(sgni·max(limit|Im(DATIN_n)|,sgni·Im(DAT_n)))
| |"Restore active reference subcarriers"
| |for re ∈ 280,299 ... 546
| |  if active_re
| |    |DAT_re ← DATIN_re
| |    |DAT_{N−re} ← DATIN_{N−re}
| |for re ∈ 19,38 ... 266
| |  if active_re
| |    |DAT_re ← DATIN_re
| |    |DAT_{N−re} ← DATIN_{N−re}
| |if active_279
| |  |DAT_279 ← DATIN_279
| |  |DAT_{N−279} ← DATIN_{N−279}
| |DAT_n ← DATIN_n if active_n
| |"Remove FM"
| |DAT ← DAT − FM
| |"apply out-of-band mask"
| |for n ∈ 0 ... N − 1
```

$$DAT_n \leftarrow DAT_n \cdot \frac{mask_n}{|DAT_n|} \text{ if } |DAT_n| > mask_n \text{ if } - active_n$$

```
| |"restore EQ"
| |DAT ← (DAT·EQ)
| |"modulate with ICFFT, then add fmsym"
| |dat ← ICFFT(DAT)
| |datt ← (stack(dat,submatrix(dat,0,TAPER−1,0,0))·w
```

$$sig \leftarrow \frac{datt}{\sqrt{\frac{\Sigma(|datt|)^2}{rows(datt)}}} + fmsym$$

```
| |sigmag ← |sig|
```

$$PAR_{iterate} \leftarrow \frac{max(sigmag)^2 \cdot rows(sigmag)}{\Sigma(sigmag)^2}$$

```
| |PAR2_{iterate} ← PARfunction2(DAT,fmsym)
```

The PAR of a Hybrid IBOC signal is inherently smaller than the PAR of the digital signal alone. This is because the practical PAR of an unprocessed digital component is 12 dB, while the FM analog signal has a constant envelope (PAR=0 dB). So the PAR of the hybrid signal increases as its digital-to-analog ratio increases. Furthermore, the PAR reduction algorithm makes a correction on the vector sum of the analog and digital components (i.e., the digital component is not clipped independently of the analog). Sometimes the peak of the digital signal is reduced by the analog signal since the instantaneous phases are more than 90 degrees apart. Therefore, the hybrid PAR reduction algorithm naturally clips the peaks when the vector sum exceeds a threshold, and not simply when the digital component exceeds a threshold. This results in less distortion, or greater PAR reduction for the same overall distortion for the Hybrid algorithm.

Improvements in FM HPA linearity performance, with an amplitude modulation component due to the addition of a digital signal to the constant-envelope FM signal, is also an enabling technology for the hybrid PAR reduction algorithm. A major factor in the efficiency improvement is achieved by including the FM analog signal within the PAR reduction algorithm. The algorithm(s) discussed here describe an improved method for accommodating unequal digital sideband power, as well as accommodating a combined analog plus digital hybrid signal, so a single HPA is used.

Figure 9:
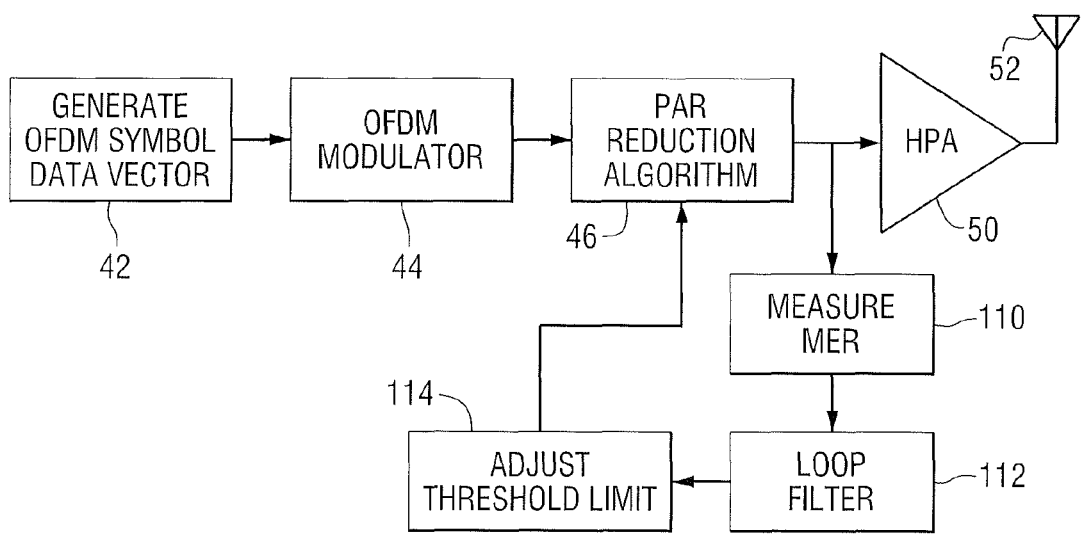
FIG. 9 is a simplified functional block diagram of a transmitter system including a PAR reduction algorithm.

In another embodiment, an adaptive threshold limit adjustment can be included. FIG. 9 is a simplified functional block diagram of a transmitter system including a PAR reduction algorithm with this feature. FIG. 9 includes the elements of FIG. 3, and further includes measuring the Modulation Error Rate 110, a loop filter 112 that filters the measured Modulation Error Rate, and adjusting the threshold limit 114. The measuring, filtering and adjusting steps can be implemented in hardware or software using known components.

The Modulation Error Rate (MER) can be computed within the exciter to maximize performance, possibly in an adaptive manner. The MER was established to assess the integrity of the IBOC digital signal. This MER measurement characterizes the degradation due to the undesirable distortion to the ideal QPSK constellation points used for each active subcarrier in the OFDM modulation. The MER is a number in dB (e.g., 14 dB) that is similar to Signal-to-Noise-Ratio (SNR), but appropriate for an IBOC digital signal. This SNR measurement is biased in a way that emphasizes distortion noise components that are closer to the QPSK decision regions (increases probability of error), and deemphasizes distortion components that do not adversely affect the probability of error. A conventional negative feedback control loop (e.g., FIG. 9) uses a loop filter to control balance between loop bandwidth (response time and accuracy) and loop noise. The threshold limit on the normalized QPSK constellation affects the MER.

The complex QPSK constellation is normalized such that the I or Q component has an absolute value of 1. This value is allowed to be reduced to accommodate the intermodulation distortion effects of clipping. The threshold limit is established to prevent the I or Q component from becoming too small, affecting BER performance. So a threshold limit of, for example, 0.75 is used as a minimum absolute value for the I or Q component. However, it is desirable to allow this value to be as small as possible, and still satisfy the MER requirement. The ideal threshold limit value may change as a function of the relative analog and digital signal component levels set by scalefm. Furthermore, the difference in lower and upper asymmetrical primary sideband levels can affect the ideal threshold limit values. It is also affected by the extended inner subcarrier partitions beyond MP1 mode. The threshold limit (e.g., 0.85 relative to nominal 1) is the lower I or Q magnitude value in the frequency-domain QPSK constellation (i.e., the HYBRID SIGNAL VECTOR), see FIG. 7.

One method for setting the threshold limit values is to compute the MER for the present digital and analog level settings, then adjust the threshold limit such that the signal passes the MER requirement with some acceptable margin. However, this can be cumbersome, and readjustment is required for each combination of relative signal levels (analog, digital upper primary, digital lower primary, and digital secondary) and Modes (active digital partitions). This can be automated by measuring the MER in the exciter, then adjusting the threshold limit within a feedback control loop to keep the MER at a desired target level. A simple block diagram is shown in FIG. 9.

The PAR reduction algorithm can also be applied to a Hybrid or an All Digital signal with unequal digital sidebands. Recent changes in FCC rules allowing an increase in Hybrid digital IBOC power, as well as unequal digital sideband power levels, has prompted renewed effort to improve both the efficiency and performance of the combining methods as well as the PAR reduction algorithm with Hybrid IBOC signals. PAR Reduction algorithms that can be used to implement an embodiment of this invention accommodate both the addition of the analog FM signal, as well as unequal digital sidebands. As used in this description, unequal digital sidebands refers to unequal levels of the upper or lower Primary digital sidebands. Prior to the new FCC ruling, the Primary upper and lower sidebands (100 to 200 kHz from center frequency) were restricted to a level −23 dB relative to the host FM analog signal. Now each sideband level can be set independently to between −23 to −13 dBc to accommodate particular first-adjacent interference conditions.

To accommodate unequal digital sidebands, QPSK constellations are constrained for the unequal subcarrier levels among the upper primary, lower primary, or secondary subcarriers. The HD Radio all-digital FM mode MP4 fills the entire ±200 kHz of bandwidth with active subcarriers with no FM analog signal present. The new secondary subcarriers within ±100 kHz are transmitted at a reduced level nominally 20 dB below the primary subcarriers beyond ±100 kHz. This is where a scaling of the secondary subcarriers (bins) of the OFDM data vector is used on the binary data. Although the same PAR reduction algorithm described previously could be applied, the relative distortion in mostly the outer secondary subcarriers is increased. This increase in relative distortion is due to the intermodulation products of the nearby primary subcarriers that are 20 dB higher in level. An additional constraint is placed upon these secondary subcarriers to further reduce this increased relative distortion.

Although it would be possible to prohibit any distortion in the secondary subcarriers by constraining them to the input OFDM symbol data vector, this is overly restrictive and would result in increased peak regrowth in the time domain signal. However, the previously described constraint allows the distortion values to be relatively large even though the constraint for margin at the threshold value (e.g., 0.85) is imposed. This distortion results in significant increase in subcarrier power due to the distortion components greater than the nominal 1.0 values. A solution to this problem is to first constrain the constellation as previously described for the primary subcarriers. An additional constraint is imposed on the secondary subcarriers where the constrained new constellation value is a weighted average of the newly constrained output and the input OFDM symbol data vector. This averaging reduces the large distortion values so that the resulting distortion is similar (proportional) to the primary subcarriers. A weighted average can further be used to adjust the degree of distortion reduction. Simulations have shown to be effective in this case.

CONSTRAIN QPSK CONSTELLATION FOR SECONDARY SUBCARRIERS:
$QPSK_n = \text{sign}(\text{Re}\{d_n\}) \cdot \max[\text{thres} \cdot |\text{Re}\{d_n\}|, \text{sign}(\text{Re}\{d_n\}) \cdot \text{Re}\{QPSK_n\}] + j \cdot \text{sign}(\text{Im}\{d_n\}) \cdot \max[\text{thres} \cdot |\text{Im}\{d_n\}|, \text{sign}(\text{Im}\{d_n\}) \cdot \text{Im}\{QPSK_n\}]$
$QPSK_n = (1 - \text{weight}) \cdot QPSK_n + \text{weight} \cdot d_n$;  additional constraint for secondary subcarriers where weight is typically 0.5 (0.45 simulated)

Experimentation with this averaging weight has resulted in an expression for the weight as a function of level of the subcarrier, relative to the highest subcarrier levels. The highest level of the subcarriers can be defined to have a level of 1. Other subcarriers are set at a (voltage) level relative to 1. For example, if the secondary subcarriers are set to 20 dB below the primary subcarriers, then the level of the Primary subcarriers is 1, and the level of the secondary subcarriers is 0.1. Similarly, if the lower Primary subcarriers are set at 10 dB below the level of the upper Primary Subcarriers, then the level of the lower Primary subcarriers is 0.316 (−10 dB). Therefore, the weight for any subcarrier at a voltage level relative to the maximum subcarrier voltage level is:

$$\text{weight} = 0.5 \cdot (1 - \text{level})$$

This technique uses a convergence bias weight to control the distortion level on the smaller subcarriers. The same method of handling unequal Primary and Secondary subcarrier levels can be re-applied to Upper and Lower digital sidebands. In this case, the subcarrier scaling (weighting) of the larger of the upper or lower primary sidebands is always set to 1. Then the other sideband is scaled relative to 1 in order to maintain the proper ratio of the upper and lower sideband levels. The same technique using the convergence bias weight to control the distortion level on the secondary subcarriers can now be applied to the smaller of the upper or lower subcarriers.

While the present invention has been described in terms of several embodiments, it will be apparent to those skilled in the art that various changes can be made to the disclosed embodiments without departing from the scope of the invention, as set forth in the following claims.

What is claimed is:

1. A method comprising:
   (a) modulating a set of subcarriers with a set of data to produce a modulated OFDM symbol vector;
   (b) modulating a FM carrier signal with the set of data to produce a modulated FM symbol;
   (c) combining the modulated OFDM symbol and the modulated FM symbol to produce a modulated hybrid symbol;
   (d) limiting the magnitude of the modulated hybrid symbol to produce a first limited modulated hybrid symbol;
   (e) demodulating the first limited modulated hybrid symbol to recover distorted QPSK constellations;
   (f) constraining the distorted QPSK constellations recovered from the first limited modulated hybrid symbol to values greater than or equal to a minimum threshold value to produce constrained QPSK constellations in a hybrid symbol vector;
   (g) demodulating the modulated FM symbol to produce an FM symbol vector;
   (h) subtracting the FM symbol vector from the hybrid symbol vector to produce a modified OFDM symbol vector;
   (i) applying a mask to inactive subcarriers in the plurality of subcarriers of the OFDM symbol vector;
   (j) modulating an OFDM symbol vector with OFDM modulation to produce a modified modulated OFDM symbol;
   (k) combining the modified modulated OFDM symbol and the modulated FM symbol to produce a modified modulated hybrid symbol; and
   (l) outputting the modified modulated hybrid symbol.

2. The method of claim 1, further comprising:
   scaling the modulated FM symbol prior to step (c).

3. The method of claim 1, further comprising:
   removing equalization compensation prior to step (f); and
   restoring equalization compensation prior to step (j).

4. The method of claim 1, wherein steps (d) through (k) are repeated prior to step (l).

5. The method of claim 1, wherein the step of constraining the distorted QPSK constellations comprises:
   assigning the minimum threshold value to bits of the distorted QPSK constellations having values less than the minimum threshold value.

6. The method of claim 1, further comprising:
   measuring a modulation error rate;
   filtering the modulation error rate; and
   adjusting the minimum threshold value in response to the filtered modulation error rate.

7. The method of claim 1, wherein step (d) applies a negative clip level to the modulated hybrid symbol.

8. The method of claim 7, wherein the negative clip level is −3 dB.

9. The method of claim 1, wherein the steps (a) through (l) are performed for multiple sets of the subcarriers in upper and lower sidebands.

10. The method of claim 9, wherein subcarriers in one of the upper or lower sidebands is set to a magnitude of 1 and the subcarriers in the other sideband are scaled relative to 1.

11. A transmitter for reducing peak-to-average power ratio in an OFDM signal, the transmitter comprising:
    a modulator for modulating a set of subcarriers with a set of data symbol vectors including an OFDM symbol vector and an FM symbol vector to produce a modulated OFDM symbol and a modulated FM symbol;
    processing circuitry for combining the modulated OFDM symbol and the modulated FM symbol to produce a modulated hybrid symbol, limiting the magnitude of the modulated hybrid symbol to produce a first limited modulated hybrid symbol, demodulating the first limited modulated hybrid symbol to recover distorted QPSK constellations, constraining the distorted QPSK constellations recovered from the first limited modulated hybrid symbol to values greater than or equal to a minimum threshold value to produce constrained QPSK constellations in a hybrid symbol vector, demodulating the FM hybrid symbol to produce an FM symbol vector, subtracting the FM symbol vector from the hybrid symbol vector to produce an OFDM symbol vector, applying a mask to inactive subcarriers in the OFDM symbol vector, modulating the OFDM symbol vector to produce a modulated OFDM symbol, combining the modified modulated OFDM symbol vector with the modulated FM symbol to produce a modified modulated hybrid symbol, and outputting the modified modulated hybrid symbol; and
    an amplifier for amplifying the modified modulated hybrid symbol.

12. The transmitter of claim 11, wherein the circuitry scales the modulated FM symbol prior to combining the modulated OFDM symbol and the modulated FM symbol to produce a modulated hybrid symbol.

13. The transmitter of claim 11, wherein the circuitry removes equalization compensation prior to constraining the distorted QPSK constellations; and
    restoring equalization compensation prior to modulating the OFDM symbol vector.

14. The transmitter of claim 11, wherein the circuitry assigns a threshold value to bits of the distorted QPSK constellations having values less than the threshold value.

15. The transmitter of claim 11, wherein the circuitry measures a modulation error rate, filters the modulation error rate, and adjusts the minimum threshold value in response to the filtered modulation error rate.

16. The transmitter of claim 11, wherein the processing circuitry applies a negative clip level to the modulated hybrid symbol.

17. The transmitter of claim 16, wherein the negative clip level is −3 dB.

18. The transmitter of claim 11, wherein the processing circuitry performs a peak-to-average power ratio reduction process on multiple sets of the subcarriers in upper and lower sidebands.

19. The transmitter of claim 18, wherein subcarriers in one of the upper or lower sidebands is set to a magnitude of 1 and the subcarriers in the other sideband are scaled relative to 1.

* * * * *